US011451552B2

(12) United States Patent
Beaudin et al.

(10) Patent No.: US 11,451,552 B2
(45) Date of Patent: Sep. 20, 2022

(54) BASIC SERVICE SET (BSS) COLOR-BASED CONTAINMENT AND MITIGATION

(71) Applicant: Hewlett Packard Enterprise Development LP, Houston, TX (US)

(72) Inventors: Andre Beaudin, Montreal (CA); Shubham Saloni, Santa Clara, CA (US); Eloy Jr Galdones, Montreal (CA); Sachin Ganu, San Jose, CA (US); Qiang Zhou, Santa Clara, CA (US); Denis Houle, Sainte-Anne-de-Bellevue (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 285 days.

(21) Appl. No.: 16/892,939

(22) Filed: Jun. 4, 2020

(65) Prior Publication Data

US 2021/0385220 A1 Dec. 9, 2021

(51) Int. Cl.
*H04L 9/40* (2022.01)
*H04W 24/08* (2009.01)
*H04W 24/10* (2009.01)
*H04W 88/08* (2009.01)

(52) U.S. Cl.
CPC ............. *H04L 63/10* (2013.01); *H04W 24/08* (2013.01); *H04W 24/10* (2013.01); *H04W 88/08* (2013.01)

(58) Field of Classification Search
CPC ..... H04W 12/08; H04W 12/73; H04W 24/08; H04W 16/02; H04W 84/12; H04L 63/10
See application file for complete search history.

(56) References Cited

U.S. PATENT DOCUMENTS

| 8,923,186 | B1* | 12/2014 | daCosta | H04W 4/70 370/312 |
| 9,668,233 | B1* | 5/2017 | Horner | H04B 17/318 |
| 9,756,682 | B2* | 9/2017 | Iyer | H04L 12/4675 |
| 2007/0171858 | A1* | 7/2007 | Grandhi | H04W 74/002 370/328 |
| 2008/0162921 | A1* | 7/2008 | Chesnutt | H04W 12/122 713/2 |
| 2014/0086081 | A1* | 3/2014 | Mack | H04L 5/001 370/252 |
| 2014/0334387 | A1* | 11/2014 | Doppler | H04W 74/0816 370/329 |

(Continued)

*Primary Examiner* — Syed Ali
(74) *Attorney, Agent, or Firm* — Jaffery Watson Mendonsa & Hamilton

(57) ABSTRACT

Operation of a wireless network access point (AP) to communicate with a first set of one or more wireless client devices using a wireless protocol in which spatial reuse of channels is supported via at least a dynamically configurable basic service set (BSS) identifier of the wireless AP. The BSS identifier is utilized to identify overlapping BSSs (OBSSs). A first set of one or more wireless client devices communicate using a wireless protocol in which spatial reuse of channels is supported via at least a dynamically configurable BSS identifier of the wireless AP. The BSS identifier is utilized to identify OBSSs. Unauthorized network activity is detected based on the BSS identifier and a received BSS identifier associated with the received transmissions. A dynamic adjustment is made to one of the BSS identifiers of the AP or the received BSS identifier in response to detected unauthorized network activity.

17 Claims, 7 Drawing Sheets

(56) References Cited

U.S. PATENT DOCUMENTS

2017/0251432 A1\* 8/2017 Park .................... H04W 40/244
2018/0132149 A1\* 5/2018 Zhao ..................... H04W 72/02
2018/0255571 A1\* 9/2018 Irie ..................... H04W 72/121
2019/0021007 A1\* 1/2019 Zhou .................... H04W 16/02
2020/0037325 A1\* 1/2020 Chu .................... H04W 74/002

\* cited by examiner

BASIC SERVICE SET (BSS) COLOR-BASED CONTAINMENT AND MITIGATION

TECHNICAL FIELD

Embodiments relate to techniques for managing network security measures. More particularly, embodiments relate to techniques mitigation of some types of denial of service (DoS) attacks over a wireless network.

BACKGROUND

Basic service set (BSS) color, also known as BSS coloring, is a method for identifying overlapping basic service sets (OBSSs). The BSS color is a numerical identifier (e.g., 1-63) corresponding to the BSS. Network devices that are IEEE 802.11ax-compliant have radios that are able to differentiate between BSSs using BSS color identifier when radios transmit on the same network channel. If detected frame has a color that is the same as the receiving device, the transmission is considered to be an intra-BSS frame transmission. In other words, the transmitting radio belongs to the same BSS as the receiver. If a detected frame has a different BSS color from its own, then the receiving device considers that frame to be an inter-BSS frame from an OBSS. Certain types of attacks can be based on use of color identifier.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
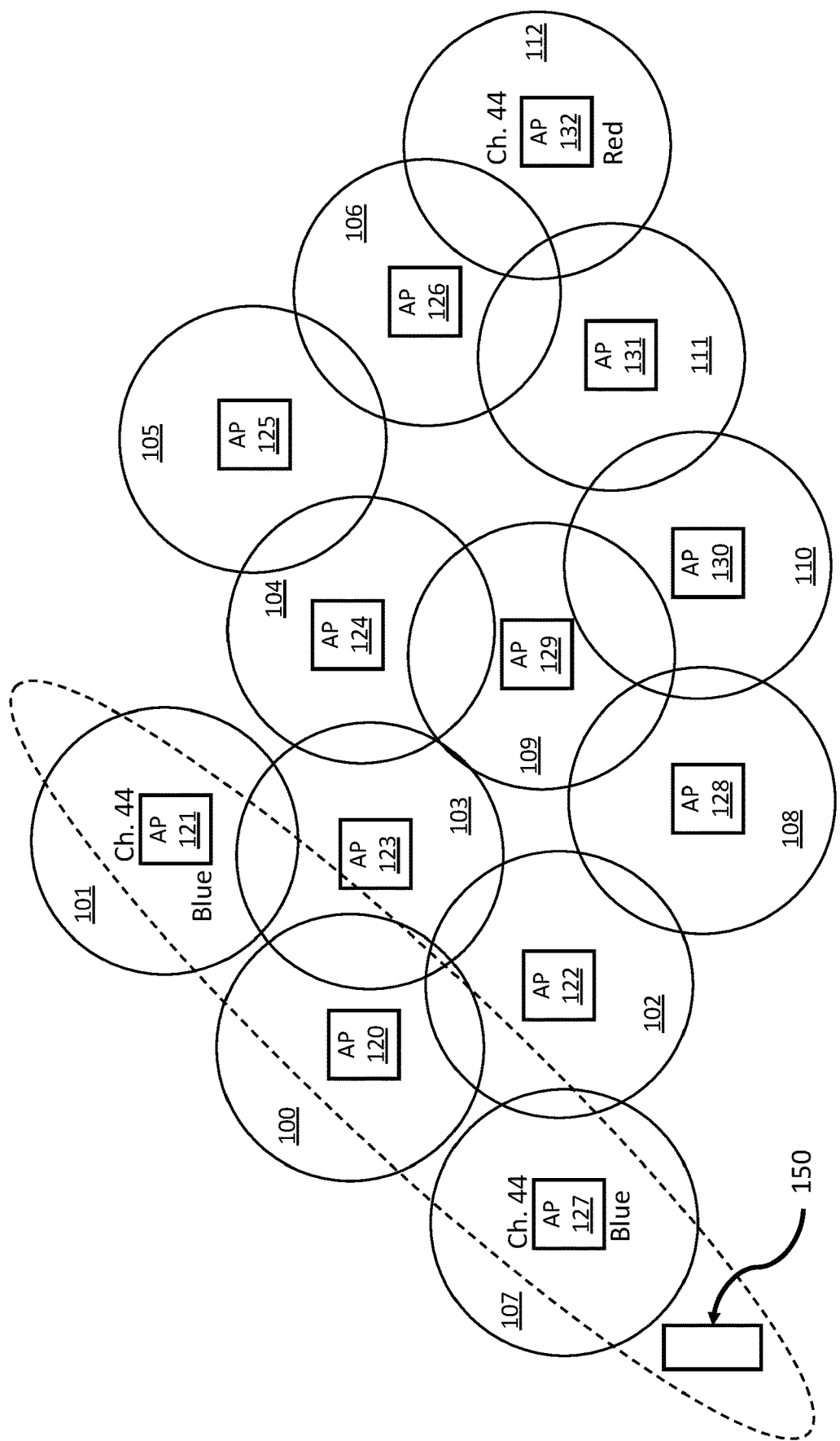
FIG. 1 is a diagram of a multi-BSS environment in which a color collision attack can occur.

In the following description, numerous specific details are set forth. However, embodiments of the invention may be practiced without these specific details. In other instances, well-known structures and techniques have not been shown in detail in order not to obscure the understanding of this description.

In general, a basic service set (BSS) color collision happens if a local BSS and a remote BSS operate utilizing the same channel and the same color within decodable radio range of each other. There are two ways for color collisions to be detected. An access point (AP) can detect a collision by scanning in which the AP can receive an inter-BSS packet and find that the same color is being used by overlapping BSSs, or a BSS station (STA) can send a collision event report frame when the STA detects that another BSS is using the same color as the local BSS. The collision event report frame can contain a single Event Report element that provides information about the color collision. The STA can schedule a BSS collision event report every collision period (e.g., dot11BSSColorCollisionSTAPeriod) unless the BSS color collision no longer exists or if the collision has been mitigated.

When a collision has been detected, the AP can start a mitigation procedure that can include, for example, changing color and notifying the clients associated to the local BSS that the BSS color is changing. This can be accomplished for example, using the BSS Color Change Announcement element, which is carried in the Beacon, Probe Response and (Re)Association Response frames. The BSS color change announcement is advertised for a period of time that is sufficient for STAs in the BSS to have the opportunity to receive at least one BSS Color Change Announcement element, which is carried in the Beacon. Once the BSS Color change announcement is complete the new BSS color will be carried out in the new Beacon, Probe Response (Re)Association Response frames.

These techniques and mechanisms are sufficient for occasional or intermittent OBSS BSS color overlap. However, when BSS color mechanisms are utilized for denial of service (DoS) type attacks the frequency and/or persistence of the color collision conditions may not fit these profiles, and additional or different responses may be needed.

Techniques described herein can be utilized to provide counter measures and containment on the AP to prevent or halt a DoS attack utilizing BSS color as part of the attack. In some embodiments, when a BSS color collision occurs, the BSS identifier (BSSID) can be confirmed using historical data. The color collision can be confirmed, for example, by keeping a history of the BSSID with their color indexes.

When the same BSS identifier causes the color collision multiple times or if a high rate of color collision occurs then, the receiving AP can be forced to stay on the same BSS color and the other (rogue) AP can be forced to move to another color index. As another example, a ratio of color change per channel can be used and, if the ratio is higher than a minimum threshold, the AP can be considered under DoS-type attack.

An IEEE 802.11ax-compliant AP has the ability to change its BSS color if it detects an OBSS using the same color. A rogue AP could, for example, reserve all color identifiers by either listening to beacon frames and transmitting to the same BSS color identifier, or by utilizing an incremental loop algorithm to transmit on all BSS color identifiers, or by sending a sequence of beacon frames with all the BSS color identifiers in burst mode. Thus, a rogue AP could cause an attack on the BSS color and non-rogue devices should be capable of detecting these types of attacks and responding appropriately.

Another type of attack can be based on an IEEE 802.11ax client that can send a color collision report to its associated AP if the client detects a color collision. The client station's report includes BSS color information for all OBSSs that the client is able to detect. However, a malicious network station could jam BSS color identifiers by sending fake color collision reports to the AP or causing a client device to send incorrect color collision reports. Thus, multiple types of BSS color attacks are possible.

In various embodiments, one or more of the following techniques can be utilized to achieve attack detection and/or attack protection with respect to BSS color based attacks. A color collision period (e.g., dot11BSSColorAPPeriod) can be increased (e.g., set to max value—255 seconds) to allow other BSSs to change color, if appropriate. A rogue AP, once identified, can be scanned for open/guest BSSID. If an open/guest BSSID is detected, a device in the local BSS can convert from AP to STA mode and connect to the rogue AP to send a STA collision report to cause the rogue AP to move to another color index. Alternatively, the local AP can change colors.

FIG. 1 is a diagram of a multi-BSS environment in which a color collision attack can occur. In the example of FIG. 1, a specific number of BSSs (e.g., 100-112) are illustrated; however, any number of BSSs and/or configuration of BSSs can be supported. Each BSS includes a corresponding AP (e.g., 120-132). As mentioned above, the BSS "color" is a numerical identifier for the corresponding BSS; however, color names (e.g., blue, red) are used with FIG. 1 for ease of description.

In the example of FIG. 1 both BSS 101 (via AP 121) and BSS 107 (via AP 127) are communicating on channel 44 and using a first BSS color (e.g., blue). BSS 112 (via AP 132) is also communicating on channel 44, but using a second BSS color (e.g., red). Thus, there is no color conflict between BSS 112 and BSS 101 or BSS 107 even though all are communicating on channel 44. However, there is the potential for a BSS color collision between transmissions in BSS 101 and BSS 107.

A BSS color collision can occur, for example, if mobile station (STA) 150 transmits a packet that is received by AP 121 and AP 127. Because both AP 121 and AP 127 are communicating on channel 44 with BSS color blue, BSS 121 and BSS 127 can be considered overlapping. Under normal operating conditions, one of AP 121 and AP 127 can change colors using the appropriate color change mechanism to avoid future BSS color collisions. However, if one of AP 121 or AP 127 is a rogue AP attempting a BSS color based DoS type attack, the rogue AP may follow the color change of the announcing AP to cause color collisions on the new color. This can continue through multiple color changes to disrupt the operation of the non-rogue AP by exhausting available color indices.

Thus, color collision detection alone is insufficient to protect against malicious devices attempting to exploit color collision responses in order to interfere with optimal functioning of APs and connected STAs. As described herein, monitoring of historical color collision information and related conditions (e.g., source device, timing, collision ratios) and use of this historical information for collision analysis can be the basis of a response escalation under conditions indicating malicious activity.

Figure 2:
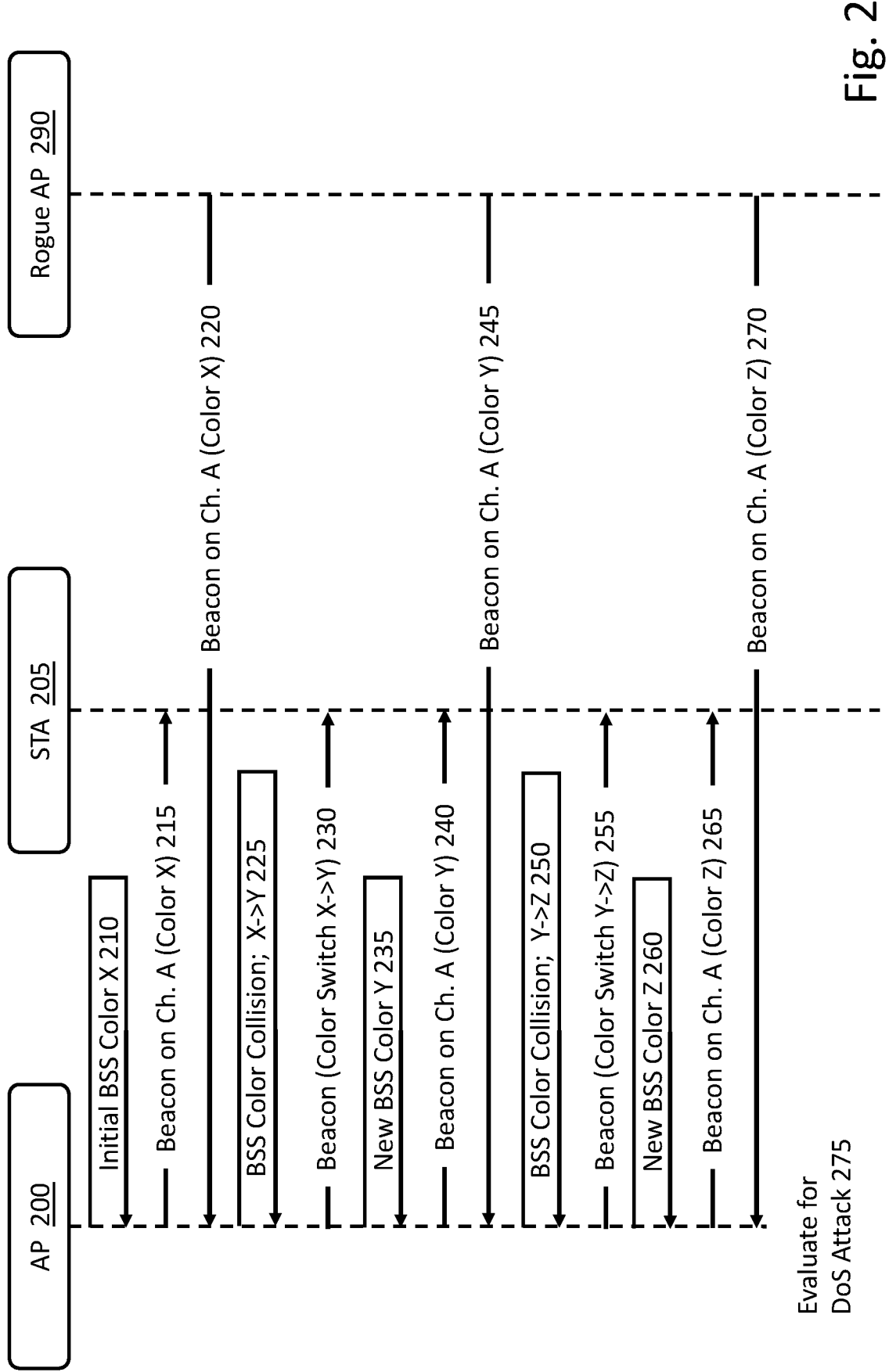
FIG. 2 is a timing diagram of one technique to detect a BSS color collision based DoS attack from a rogue AP and initiating a response thereto.

FIG. 2 is a timing diagram of one technique to detect a BSS color collision based DoS attack from a rogue AP and initiating a response thereto. In the example of FIG. 2, AP 200 is the victim AP that is being attacked, AP 290 is the rogue AP that is attacking AP 200 and STA (client) 205 is a device that is part of the AP 200 BSS.

AP 200 sets its initial BSS color (e.g., X), 210 for Channel A for its BSS. In one embodiment, AP 200 sends an IEEE 802.11 Beacon signal on Channel A to STA 205 using the BSS color ('X'), 215. Any number of devices can receive this beacon signal including, for example AP 290. AP 290, attempting to perpetuate a DoS-type attack on AP 200, can send an IEEE 802.11 Beacon signal on Channel A to STA 205 indicating the same BSS color (e.g., X), 220, to cause a BSS color collision condition.

In response to receiving the beacon signal from AP 290, AP 200 can assume a color collision on the channel ('A') and initiate a BSS color change (e.g., X to Y), 225. AP 200 can then transmit an IEEE 802.11 Beacon signal on Channel A to STA 205 with, for example, a BSS Color Change Switch Announcement to announce the BSS color change ('X→Y'), 230. AP 200 can then change to the new BSS color ('Y'), 235.

In one embodiment, AP 200 then sends an IEEE 802.11 Beacon signal on Channel A to STA 205 using the new BSS color ('Y'), 240. Any number of devices can receive this beacon signal including, for example, AP 290. AP 290, attempting to continue the DoS-type attack on AP 200, can also send an IEEE 802.11 Beacon signal on Channel A to STA 205 using the new BSS color (e.g., Y), 245, to cause a BSS color collision condition.

In response to receiving the beacon signal from AP 290, AP 200 can assume another color collision on the channel ('A') and initiate another BSS color change (e.g., Y to Z), 250. AP 200 can then transmit an IEEE 802.11 Beacon signal on Channel A to STA 205 with, for example, a BSS Color Change Switch Announcement to announce the BSS color change ('Y→Z'), 255. AP 200 can then change to the new BSS color ('Z'), 260. In one embodiment, AP 200 then sends an IEEE 802.11 Beacon signal on Channel A to STA 205 using the new BSS color ('Z'), 265.

In response to the BSS Color Change Switch Announcement, AP 290 can also send an IEEE 802.11 Beacon signal on Channel A to STA 205 using the new BSS color (e.g., Z), 270. The following of color changes announced by AP 200 by rogue AP 290 can, if continued, cause a reduction in functionality provided by AP 200 thus perpetuating the DoS-type attack.

In various embodiments, AP 200 can evaluate the color collisions to determine whether the color collisions are part of a DoS attack, 275. In some embodiments, after some threshold number of times (e.g., 3, 10, 25) detecting a BSS color collision with AP 290 using historical data, AP 200 can determine that the BSS color collisions are part of a BSS color collision based DoS-type attack from (or through) AP 290. In alternate embodiments, if AP 290 has a high rate of causing color collisions (e.g., based on the historical data), AP 200 can determine that the BSS color collisions are part of a BSS color collision based DoS attack from (or through) AP 290.

Figure 3:
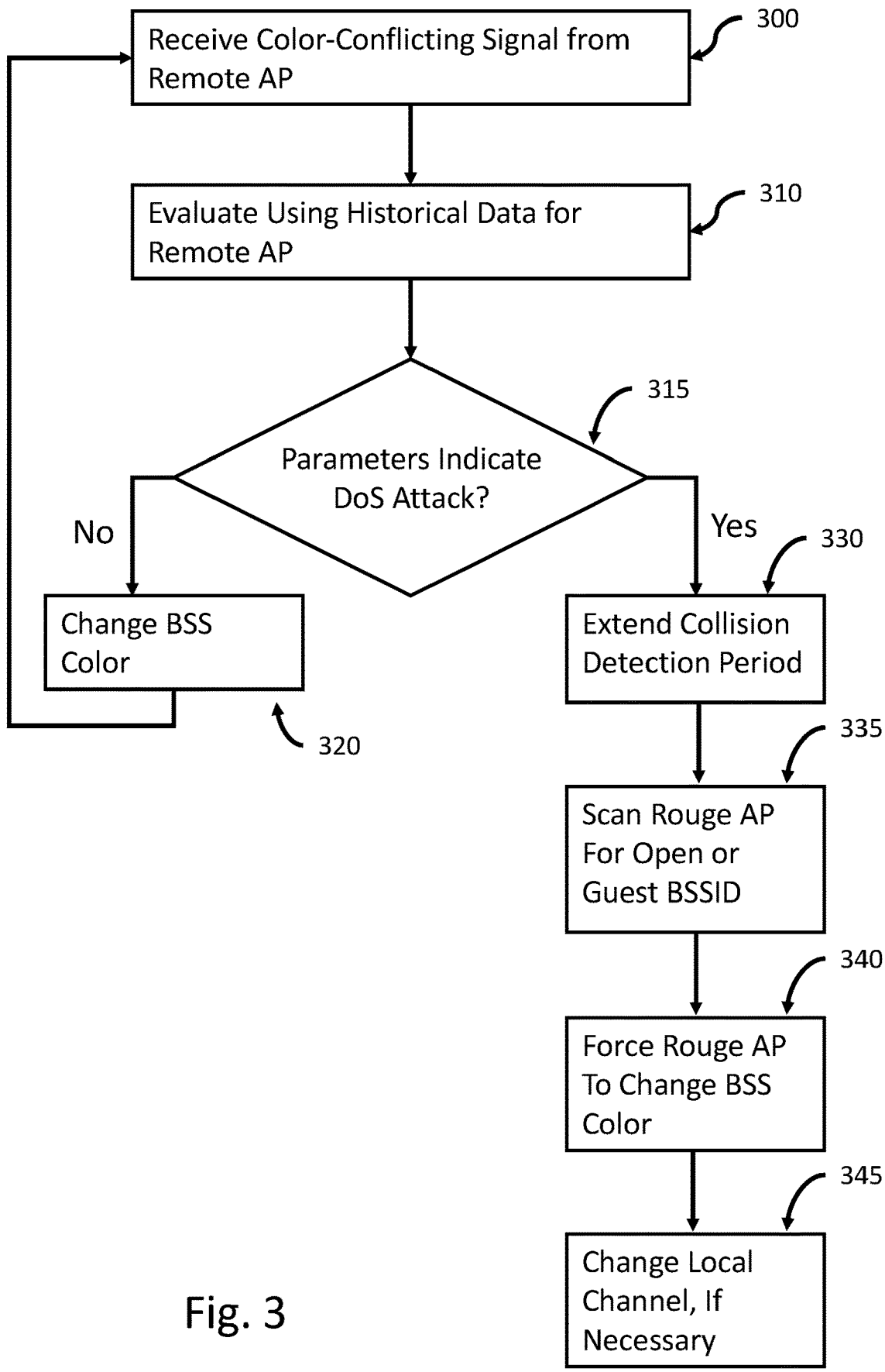
FIG. 3 is a flow diagram of one embodiment of a technique to respond to a BSS color collision type DoS attack.

FIG. 3 is a flow diagram of one embodiment of a technique to respond to a BSS color collision type DoS attack. The functionality of FIG. 3 can be provided by an AP under attack (e.g., AP 200).

A color-conflicting signal can be received from a remote AP, 300. The color-conflicting signal can be, for example, a beacon signal as discussed above. Historical conflict data can be maintained by the receiving AP to be used to assist in determining whether the receiving AP is under attack. The historical data can be, for example, a table of APs that have sent color-conflicting transmissions to the receiving AP. The table can include color information, timing information, aggregate numbers, frequencies and/or other relevant information. The historical data can be used to evaluate the current color conflict, 310.

If the historical data and/or other parameters do not indicate a color-based DoS attack, 315, the local BSS color can be changed, 320. If the historical data and/or other parameters do indicate a color-based DoS attack, 315, the collision detection period can be extended, 330. In some embodiments, a maximum-length detection period can be utilized. This can give the receiving AP more time to evaluate the current color conditions and make an appropriate response.

In some embodiments, the receiving AP can scan the rogue AP to determine if the rogue AP has an open or guest BSSID, 335. If the rogue AP has an open or guest BSSID, the receiving AP (or another device that is part of its BSS) can connect to the rogue AP in STA mode and send a STA collision report in an attempt to force the rogue AP to move to a different color index. That is the receiving (victim) AP can cause a false color collision report to be sent to the rogue (attacking) AP to cause the rouge AP to change BSS colors. This may be sufficient to end the attack on the receiving AP. If the rogue AP cannot be forced to a different color index, the receiving AP can change channels, 345. If the rouge (attacking) AP is following color changes, a channel change by the receiving (victim) AP may be sufficient to end the attack on the receiving AP.

Figure 4:
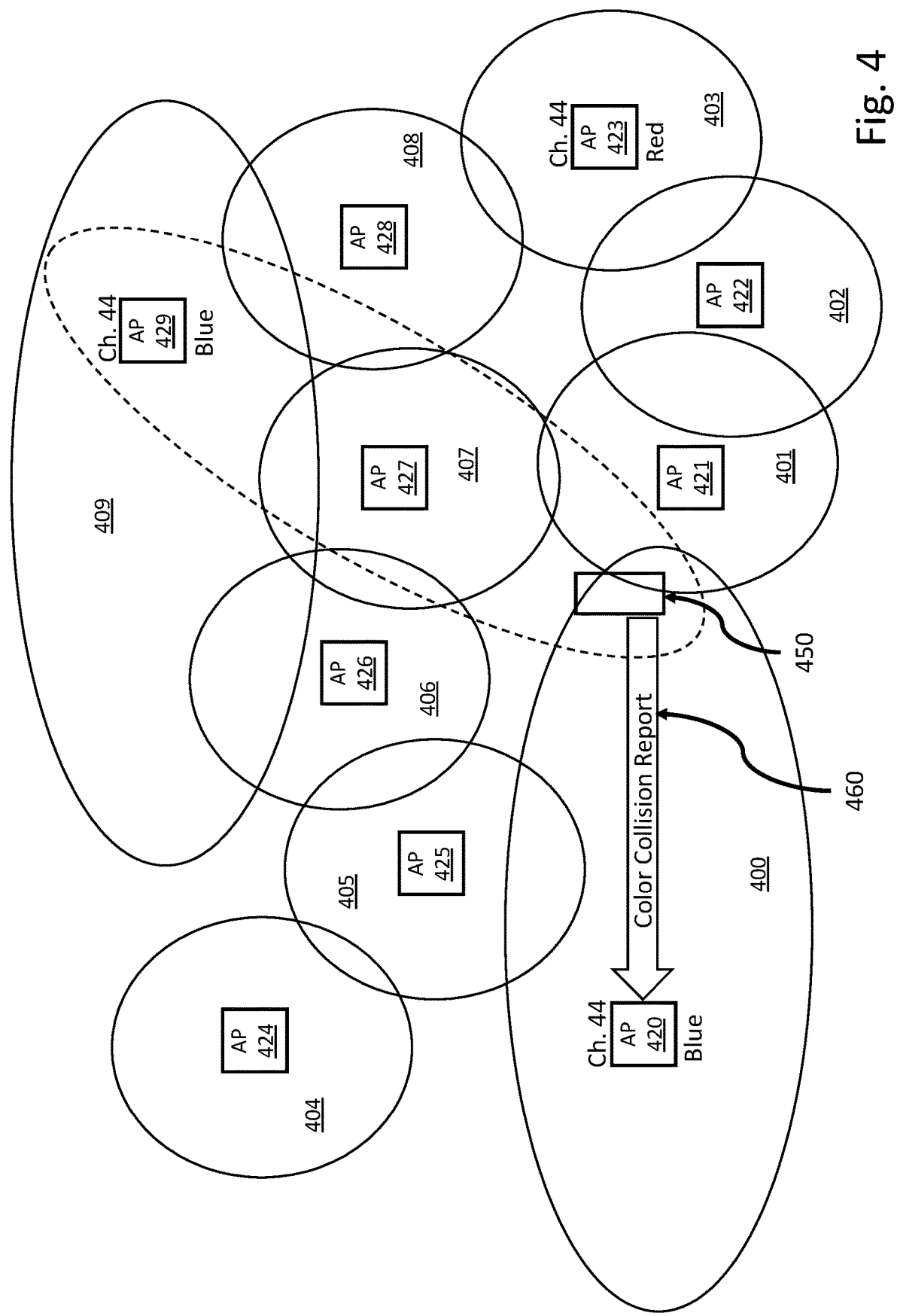
FIG. 4 is a diagram of a multi-BSS environment in which a color collision attack based on a STA color collision report can occur.

FIG. 4 is a diagram of a multi-BSS environment in which a color collision attack based on a STA color collision report can occur. In the example of FIG. 4, one example configuration having several BSSs (e.g., 400-409) is illustrated; however, any number of BSSs can be supported. Each BSS includes a corresponding AP (e.g., 420-429). As mentioned above, the BSS "color" is a numerical identifier for the corresponding BSS; however, color names (e.g., blue, red) are used with FIG. 4 for ease of description.

In the example of FIG. 4, both BSS 400 (via AP 420) and BSS 409 (via AP 429) are communicating on channel 44 and using a first BSS color (e.g., blue). BSS 403 (via AP 423) is also communicating on channel 44, but using a second BSS color (e.g., red). Thus, there would be no conflict between communications on channel 44 for BSS 403 with respect to BSS 400 and BSS 409, both of which also utilize channel 44. However, there is potential for a conflict between communications on channel 44 for BSS 400 and BSS 409.

A BSS color collision can occur, for example, if mobile station (STA) 450 transmits a packet that is received by AP 420 and AP 429. Because both AP 420 and AP 429 are communicating on channel 44 with BSS color blue, BSS 400|$_{[PD1]}$and BSS 409 can be considered overlapping. Upon detecting the color collision condition, STA 450 can transmit color collision report 460 to AP 420, which can cause AP 420 to change colors using the appropriate color change mechanism to avoid future BSS color collisions.

However, if STA 450 is involved in a BSS color based DoS-type attack, STA may change colors following AP 420 and continue to send color collision reports following color changes announced by AP 420. This can continue through multiple color changes to disrupt the operation of AP 420. The result can be a DoS-type attack against AP 420 based on malicious color collision reports from STA 450 by, for example, following color changes by AP 420 until all color indices are exhausted.

Figure 5:
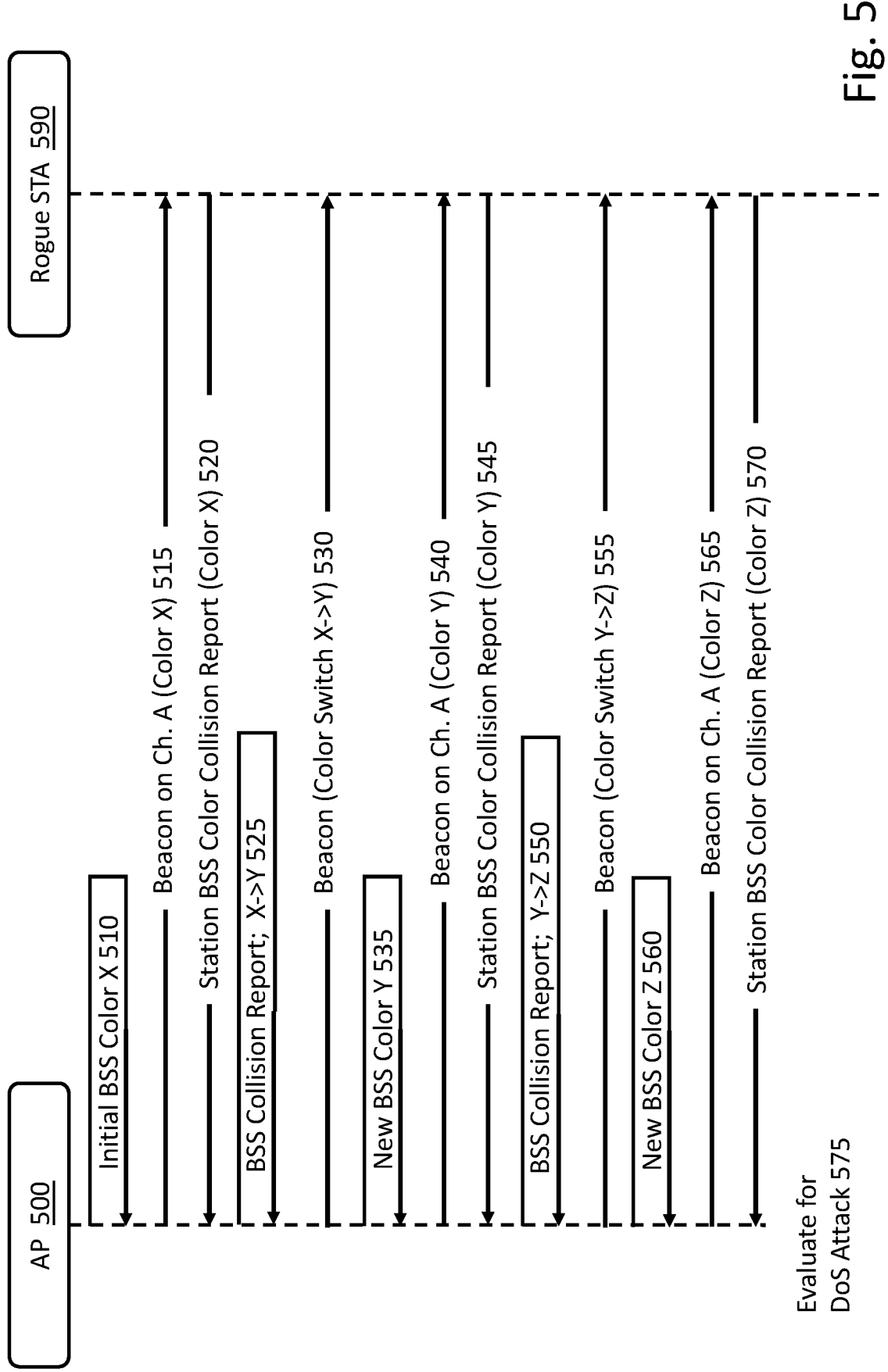
FIG. 5 is a timing diagram of one technique to detect a STA collision report based DoS attack and initiating a response thereto.

FIG. 5 is a timing diagram of one technique to detect a STA collision report based DoS attack and initiating a response thereto. In the example of FIG. 5, AP 500 is the victim AP that is being attacked, STA (Client) 590 is providing malicious STA color collision reports to further a color-based DoS attack on AP 500.

AP 500 sets its initial BSS color (e.g., X), 510, for Channel A for its BSS. In one embodiment, AP 500 sends an IEEE 802.11 Beacon signal on Channel A to STA 590 using the BSS color ('X'), 515. Any number of devices can receive this beacon signal (additional devices not illustrated in FIG. 5). To initiate (or further) the BSS color based attack, STA 590 can send an IEEE 802.11 Station BSS Color Collision Report 520 on Channel A to AP 500 indicating a BSS color collision condition at STA 590.

In response to the STA Color Collision Report, AP 500 can initiate a BSS color change (e.g., X to Y), 525. AP 500 can then transmit an IEEE 802.11 Beacon signal on Channel A to STA 590 with, for example, a BSS Color Change Switch Announcement to announce the BSS color change ('X→Y'), 530. AP 500 can then change to the new BSS color ('Y'), 535.

In one embodiment, AP 500 then sends an IEEE 802.11 Beacon signal on Channel A to STA 590 using the new BSS color ('Y'), 540. To further the BSS color based attack, STA 590 can send another IEEE 802.11 Station BSS Color Collision Report on Channel A to AP 500 indicating a BSS color collision condition on the new color, 545.

In response to the STA Color Collision Report, AP 500 can initiate a BSS color change (e.g., Y to Z), 550. AP 500 can then transmit an IEEE 802.11 Beacon signal on Channel A to STA 590 with, for example, a BSS Color Change Switch Announcement to announce the BSS color change ('Y→Z'), 555. AP 500 can then change to the new BSS color ('Z'), 560.

In one embodiment, AP 500 then sends an IEEE 802.11 Beacon signal on Channel A to STA 590 using the new BSS color ('Z'), 565. To further the BSS color based attack, STA 590 can send another IEEE 802.11 Station BSS Color Collision Report on Channel A to AP 500 indicating a BSS color collision condition on the new color, 570.

AP 500 can evaluate the color collision reports to determine whether the color collisions are part of a DoS attack, 575. In some embodiments, a multi-level analysis is performed to determine if the STA color collision reports are part of a DoS attack or naturally occurring color collisions. Various techniques for this analysis are provided in greater detail below.

Figure 6:
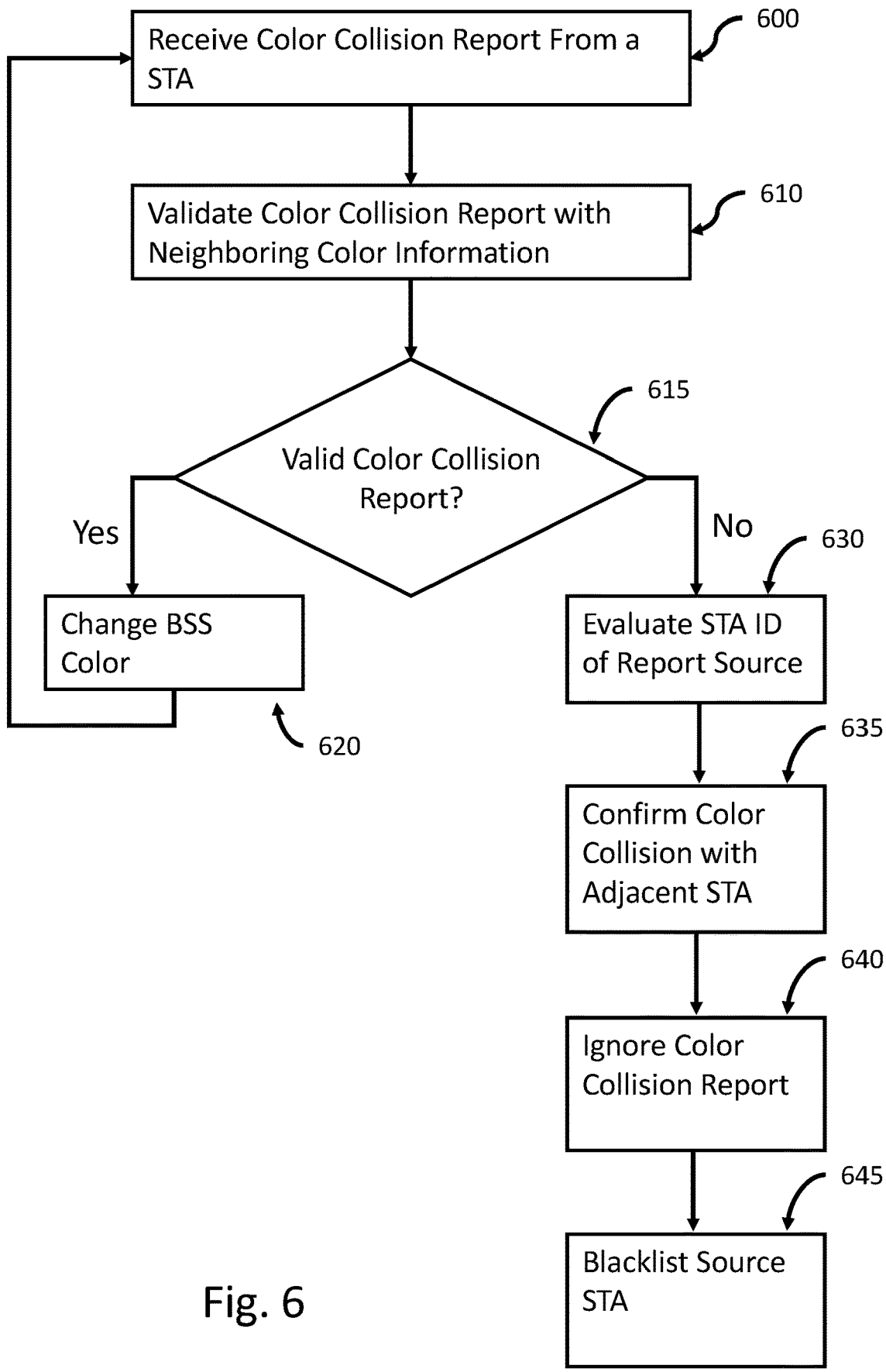
FIG. 6 is a flow diagram of one embodiment of a technique to respond to a STA collision report based DoS attack.

FIG. 6 is a flow diagram of one embodiment of a technique to respond to a STA collision report based DoS attack. The functionality of FIG. 6 can be provided by an AP under attack (e.g., AP 500) and can provide a multi-level analysis to detect an attempted STA collision report based DoS-type attack.

A color collision report can be received from a remote STA, 600. The color collision report can be, for example, a report as defined by the IEEE 802.11ax standard, or a report in a different format that indicates the STA has detected a color collision condition. In some embodiments, the color collision report can be validated by the receiving AP, 610. This can be accomplished, for example by using AP neighboring information to confirm the report information from other OBSSs. This is the first level of the multi-level analysis.

If the color collision report can be validated with AP neighboring information, 615, the local BSS color can be changed, 620. If the color collision report cannot be validated with AP neighboring information, 615, the STA identifier of the report source can be checked, 630. If only one STA is reporting a color collision and/or a single STA is reporting many color collisions and/or frequent color collisions, the report can be considered suspect and either flagged for further analysis or a response to a color based DoS attack can be initiated. This is the second level of the multi-level analysis.

In some embodiments, the receiving AP can confirm the color collision with an adjacent STA, 635. This is the third level of the multi-level analysis. In some embodiments, if the color collision report cannot be validated at the second or third level, the color collision report can be ignored, 640. In some embodiments, the source STA can also be blacklisted, 645, to avoid further attack attempts.

The example of FIG. 6 is a three-level analysis; however, more complex embodiments (e.g., four-level analysis with confirmation from multiple adjacent STAs) can also be provided.

Figure 7:
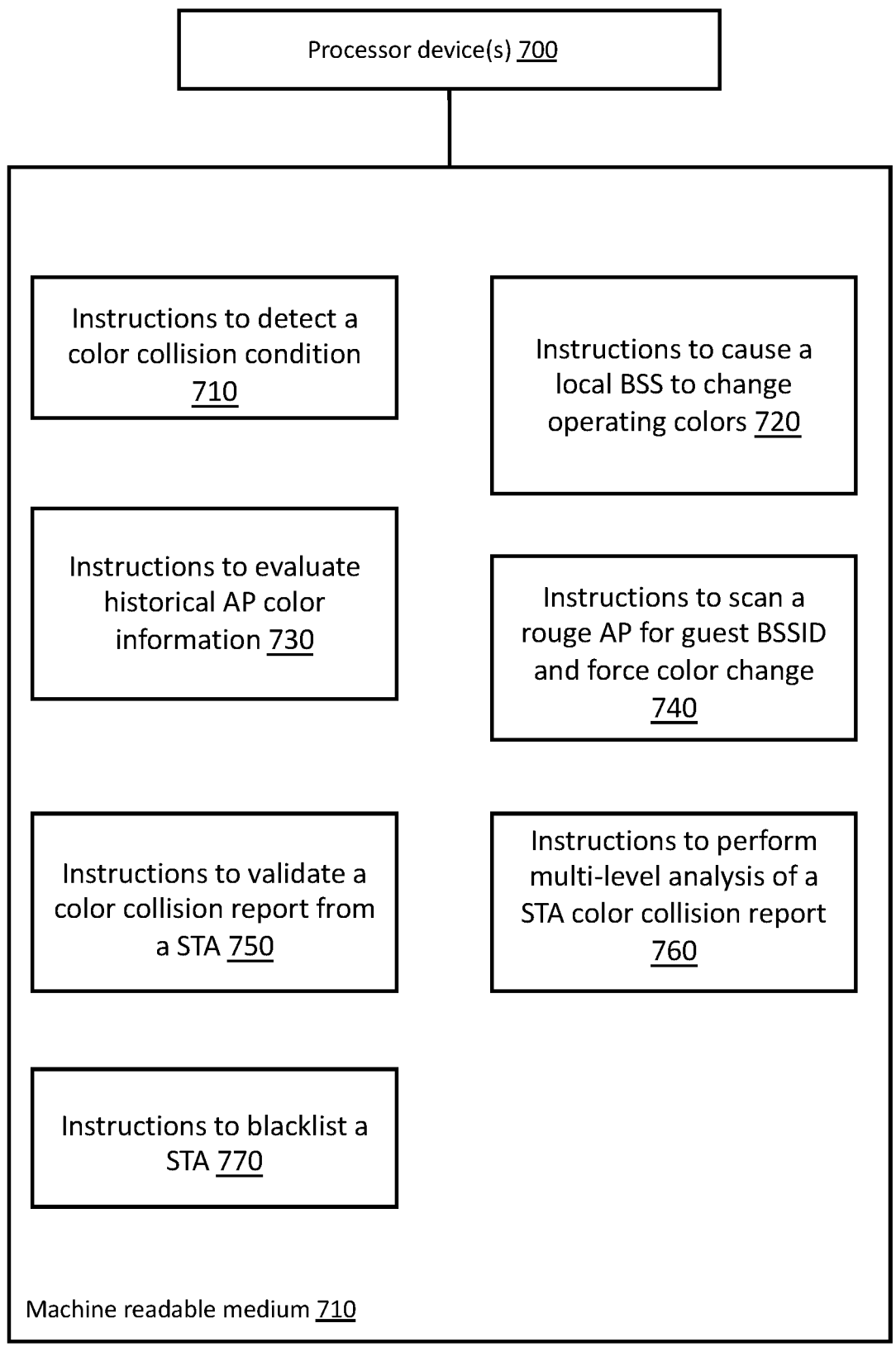
FIG. 7 is a block diagram of one embodiment of a processing resource and a machine readable medium encoded with example instructions to provide detection and mitigation of a color collision based DoS type attack.

FIG. 7 is a block diagram of one embodiment of a processing resource and a machine readable medium encoded with example instructions to provide detection and mitigation of a color collision based DoS type attack.

Machine readable medium 710 is non-transitory and is alternatively referred to as a non-transitory machine readable medium 710. In some examples, the machine readable medium 710 may be accessed by processor device(s) 700. Processor device(s) 700 and machine readable medium 710 may be included, for example, in wireless network AP or other similar device.

Machine readable medium 710 may be encoded with example instructions 710, 720, 730, 740, 750, 760 and 770. Instructions 710, 720, 730, 740, 750, 760 and 770, when executed by the processor device(s) 700, may implement various aspects of techniques to provide color collision based attack detection and protection/mitigation as described herein.

Instructions 710 can cause processor device(s) 700 to detect a color collision condition. This can be accomplished as described, for example, with respect to FIG. 2. Instructions 720 can cause processor device(s) 700 to cause a local BSS to change colors ether in response to a single color collision condition and/or in response to a DoS attack based on color collisions.

Instructions 730 can cause processor device(s) 700 to evaluate historical AP color information. This can be accomplished, for example, as described with respect to FIG. 3. Instructions 740 can cause processor device(s) 700 to scan a rogue AP for a guest or open BSSID and to force the rogue AP to change colors.

Instructions 750 can cause processor device(s) 700 to validate a color collision report from a STA. This can be accomplished, for example, as described with respect to FIG. 6. Instructions 760 can cause processor device(s) 700 to perform a multi-level analysis of a STA color collision report to determine whether the color collision report is part of a DoS type attack. This can be accomplished, for example, as described with respect to FIG. 6.

Instructions 770 can cause processor device(s) 700 to blacklist a STA if previous analysis determines the STA is part of a DoS attack on the AP. Additional and/or different instruction modules can also be supported and included in machine readable medium 710.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A wireless network access point (AP) to communicate with a first set of one or more wireless client devices, the wireless AP comprising:
a memory device;
a wireless network interface;
a hardware processor coupled with the memory device and the wireless network interface, the hardware processor to receive transmissions via the wireless network interface using a wireless protocol in which spatial reuse of channels is supported via at least a dynamically configurable basic service set (BSS) identifier of the wireless AP, wherein the BSS identifier is utilized to identify overlapping BSSs (OBSSs), the hardware processor further to detect unauthorized network activity based on one or more BSS identifiers associated with the received transmissions and historical characteristics associated with the received one or more BSS identifiers, and, in response to detected unauthorized network activity, to either cause a dynamic adjustment to the BSS identifier of the wireless AP or trigger a change in a remote AP associated with a BSS identifier of the remote AP, wherein triggering a change in the remote AP associated with the BSS identifier of the remote AP comprises:
causing the wireless network AP to convert from an AP mode to a STA mode;
causing the wireless network AP connect to the remote AP in the STA mode to send a STA collision report to cause the remote AP to move to change BSS identifiers.

2. The wireless network AP of claim 1 wherein the unauthorized network activity is determined based on a number of traffic BSS identifier collisions detected within a pre-selected period of time.

3. The wireless network AP of claim 1 wherein the unauthorized network activity is determined based on a number of collision reports from a wireless client device within a pre-selected period of time.

4. The wireless network AP of claim 3 wherein the hardware processor blocks the wireless client device in response to the number of collision reports from the wireless client device exceeding a pre-selected threshold within the pre-selected period of time.

5. The wireless network AP of claim 1 wherein the hardware processor stores the historical characteristics associated with the received one or more BSS identifiers in the memory device to be utilized in a multi-level analysis to detect the unauthorized network activity.

6. The wireless network AP of claim 1 wherein the hardware processor further functions to extend a collision detection period in response to a BSS identifier indicating OBSSs.

7. A non-transitory computer-readable medium having stored thereon instructions that, when executed by one or more processors, cause the one or more processors in wireless network access point (AP) to:
communicate with a first set of one or more wireless client devices using a wireless protocol in which spatial reuse of channels is supported via at least a dynamically configurable basic service set (BSS) identifier of the wireless AP, wherein the BSS identifier is utilized to identify overlapping BSSs (OBSSs);
detect unauthorized network activity based on one or more BSS identifiers associated with the received transmissions and historical characteristics associated with the received one or more BSS identifiers; and in response to detected unauthorized network activity, cause either a dynamic adjustment to the BSS identifier of the wireless AP or trigger a change in a remote AP associated with a BSS identifier of the remote AP, wherein triggering the change in the remote AP associated with the BSS identifier of the remote AP comprises:
causing the wireless network AP to convert from an AP mode to a STA mode;
causing the wireless network AP connect to the remote AP in the STA mode to send a STA collision report to cause the remote AP to move to change BSS identifiers.

8. The non-transitory computer-readable medium of claim 7 wherein the unauthorized network activity is determined based on a number of traffic BSS identifier collisions detected within a pre-selected period of time.

9. The non-transitory computer-readable medium of claim 7 wherein the unauthorized network activity is determined based on a number of collision reports from a wireless client device within a pre-selected period of time.

10. The non-transitory computer-readable medium of claim 9 further comprising blocking the wireless client device in response to the number of collision reports from the wireless client device exceeding a pre-selected threshold within the pre-selected period of time.

11. The non-transitory computer-readable medium of claim 7 further comprising instructions that, when executed by the one or more processors, cause the one or more processors to store the historical characteristics associated with the received one or more BSS identifiers in the memory device to be utilized in a multi-level analysis to detect the unauthorized network activity.

12. The non-transitory computer-readable medium of claim 11 further comprising instructions that, when executed by the one or more processors, cause the one or more processors to extend a collision detection period in response to a BSS identifier indicating OBSSs.

13. A method for operating a wireless network access point (AP), the method comprising:
communicating with a first set of one or more wireless client devices using a wireless protocol in which spatial reuse of channels is supported via at least a dynamically configurable basic service set (BSS) identifier of the wireless AP, wherein the BSS identifier is utilized to identify overlapping BSSs (OBSSs);
detecting unauthorized network activity based on one or more BSS identifiers associated with the received transmissions and historical characteristics associated with the received one or more BSS identifiers; and
causing either a dynamic adjustment to the BSS identifier of the wireless AP or trigger a change in a remote AP associated with a BSS identifier of the remote AP in response to detected unauthorized network activity, wherein triggering the change in the remote AP associated with the BSS identifier of the remote AP further comprises:
causing the wireless network AP to convert from an AP mode to a STA mode;
causing the wireless network AP connect to the remote AP in the STA mode to send a STA collision report to cause the remote AP to move to change BSS identifiers.

14. The method of claim 13 wherein the unauthorized network activity is determined based on a number of traffic BSS identifier collisions detected within a pre-selected period of time.

15. The method of claim 13 wherein the unauthorized network activity is determined based on a number of collision reports from a wireless client device within a pre-selected period of time.

16. The method of claim 15 further comprising blocking the wireless client device in response to the number of collision reports from the wireless client device exceeding a pre-selected threshold within the pre-selected period of time.

17. The method of claim 13 further comprising causing the one or more processors to extend a collision detection period in response to a BSS identifier indicating OBSSs.

* * * * *